Sept. 21, 1937.   S. SVENSON   2,093,689
MOTOR ACTUATOR
Filed July 30, 1935   2 Sheets-Sheet 1
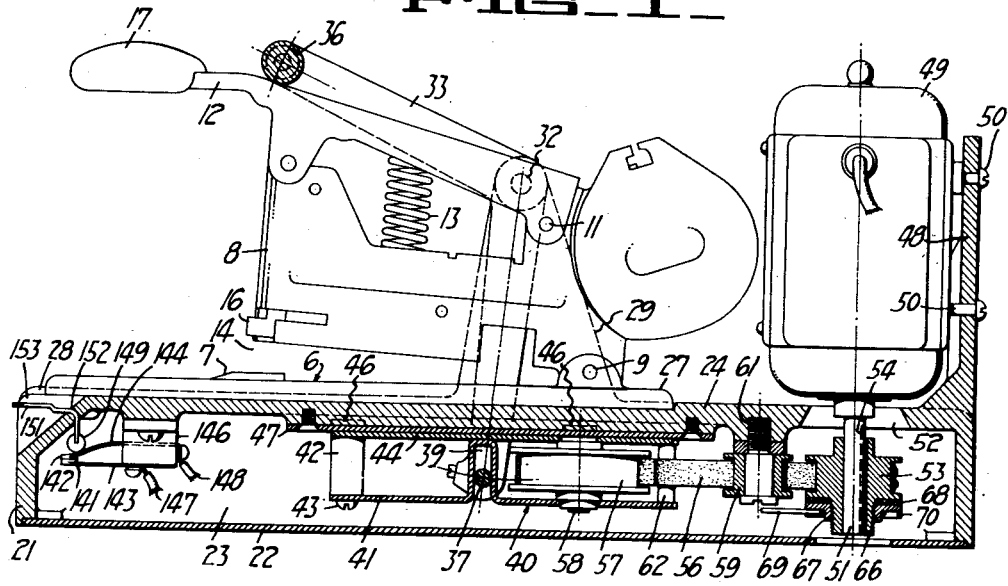
FIG_1_
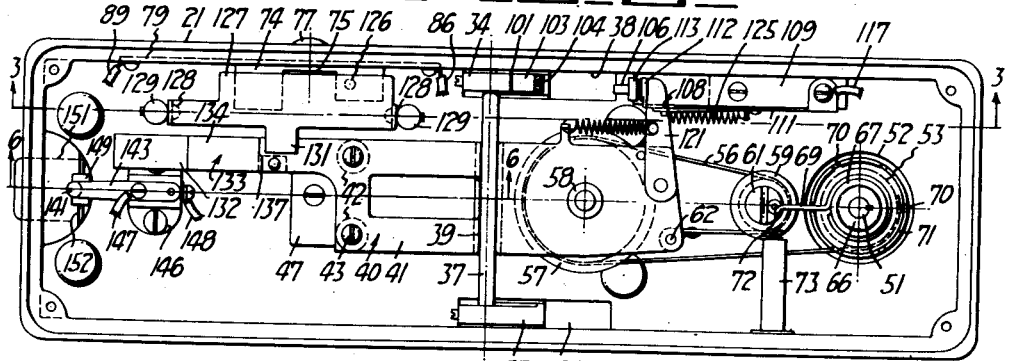
FIG_2_
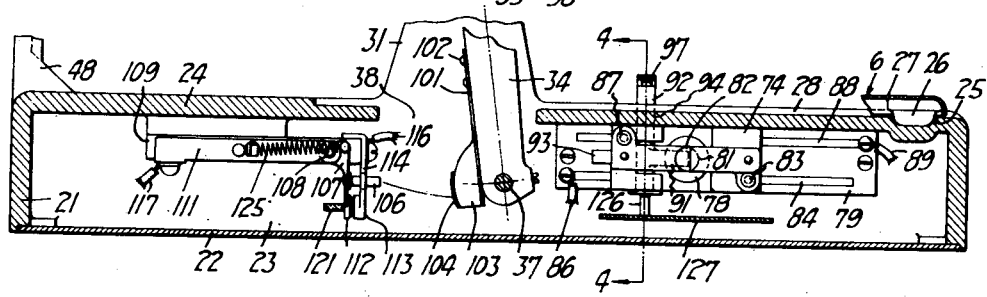
FIG_3_
INVENTOR.
Sven Svenson
BY Marcus Lothrop
ATTORNEY.

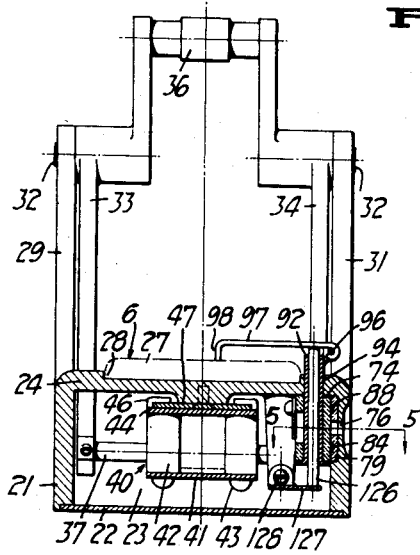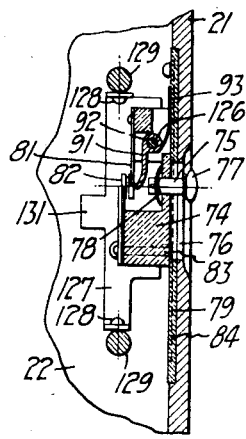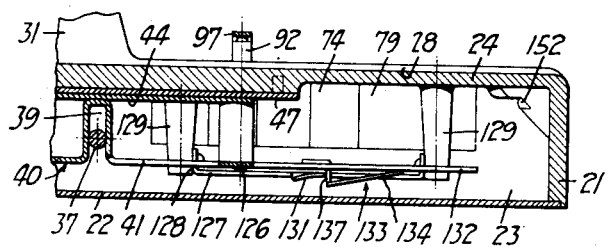

Patented Sept. 21, 1937

2,093,689

UNITED STATES PATENT OFFICE 2,093,689

MOTOR ACTUATOR

Sven Svenson, San Francisco, Calif.

Application July 30, 1935, Serial No. 33,840

7 Claims. (Cl. 1—2.2)

My invention relates to means using a source of power, such as electricity, for actuating devices such as staplers and the like which are designed primarily for hand operation, and refers especially to devices of the character disclosed in my Patent No. 1,940,980, issued December 26, 1933.

An object of my invention is to provide means for operating a mechanism such as a stapler, for instance, by electricity.

Another object of my invention is to provide a motor actuator which can be utilized in conjunction with a standard type of hand-operated stapler.

Another object of my invention is to provide an actuator which depends upon a rotating source of power, such as an electric motor, for its operation.

A further object of my invention is in general to improve power actuators.

An additional object of my invention is to provide a motor actuator utilizing a rotary source of power, such as an electric motor, to provide a stamping motion characteristic of staplers, time stamps and the like.

The foregoing and other objects are attained in the embodiment of the invention illustrated in the drawings, in which Fig. 1 is a side view in longitudinal cross-section on a vertical plane, of a motor actuator in accordance with my invention, a typical stapling machine being shown therewith.

Fig. 2 is a bottom view of the mechanism of Fig. 1.

Fig. 3 is a cross-section the plane of which is indicated by the line 3—3 of Fig. 2.

Fig. 4 is a cross-section the plane of which is indicated by the line 4—4 of Fig. 3.

Fig. 5 is a cross-section the plane of which is indicated by the line 5—5 of Fig. 4.

Fig. 6 is a detail in section along the line 6—6 of Fig. 2.

In its preferred form the motor actuator of my invention includes a base adapted to receive and hold a stapling machine. On the base is mounted an electric motor adapted to be energized by the positioning in the stapling machine of a sheet to be stapled, the energized motor operating a stapling machine actuating mechanism reciprocably mounted on the base.

Although the motor actuator of my invention is particularly described herein in conjunction with a stapling machine, it can be utilized in conjunction with various other mechanisms such as time stamps and the like. For illustration I have chosen a hand stapling machine now available on the market and known as the "Bates", but various other kinds of stapling machines can be utilized as well. The stapling machine shown herein includes a frame 6 on which is mounted a stapling anvil 7. Also mounted on the frame 6 is a stapling head 8 secured by a transverse pivot 9. Mounted by a pivot 11 on the head 8 is an actuating lever 12, designed to be moved from the position shown in Fig. 1 to a depressed position in which the lever 12 approaches the stapling head 8 and the stapling head closely approaches the frame 6. A coil spring 13 is interposed between the stapling head 8 and the lever 12, to urge them apart while suitable springs (not shown) bias the stapling head 8 into the position shown in Fig. 1, spaced away from the frame 6 to provide a slot 14 between the anvil 7 and the stapling mechanism 16.

In the usual operation of the hand stapler, a sheet is placed in the slot 14 and the handle 17 is depressed a suitable distance, bringing the stapling mechanism 16 into contact with the subposed sheet and piercing the sheet with a staple which is clinched on the anvil 7.

In accordance with my present invention, I provide a motor actuator for operating by electricity the stapling machine described. To this end, I provide a base 21 which preferably is a hollow housing closed by a removable plate 22 to provide an interior chamber 23. The upper portion 24 of the base is provided at suitable locations with a plurality of depressions 25, each of which is designed to receive one of the rubber supporting pads 26 with which the stapling machine is equipped. The stapling machine base plate 27 itself fits snugly within a depressed portion 28 of the base in order that there may be an approximate planar continuity between the base plate 27 of the stapling machine and the upper portion 24 of the base.

To hold the stapling machine on the base against accidental dislodgment, there is a pair of uprights 29 and 31 intergrally rising from the base to support pivot pins 32 having arms 33 and 34 journalled thereon. The arms at their uppermost ends are joined by a spool 36 to form a yoke overlying the actuating lever 12 and just in contact therewith in the position shown in Fig. 1. Since the yoke cannot be lifted from the position shown, in order for a stapling machine initially to be seated in the depressions 25 and 28, it is necessary to grasp the handle 17 slightly. When the pads 26 on the stapler seat in the depressions 25, the handle 17 is released to abut the yoke 36. The stapler cannot subsequently be removed without first depressing the handle 17 to compress the springs which normally hold the stapler in the position shown in Fig. 1.

The levers 33 and 34 are used to actuate the stapling machine and so at their lower ends they are joined by a cross-rod 37 situated within the chamber 23, the levers passing through slots 38 in the base for that purpose. The cross-rod 37 operates within a slot 39 formed in a slide 40 mounted to move reciprocably within the chamber 23. The lower plate 41 of the slide is held by a plurality of spacing pillars 42 and screws 43 to a guide plate 44, for constraining the slide to rectilinear movement. At appropriate intervals the plate 44 is provided with turned-over ears 46 slidable along the edges of a track plate 47 secured to the base 21.

In accordance with my present invention, instead of using a solenoid or comparable reciprocating source of power, I preferably use an electric motor or similar rotary source of motive power. To an integral bracket 48 upstanding from one end of the base a suitable rotary electric motor 49 is secured by fastenings 50. The drive shaft 51 of the motor extends through an aperture 52 in the portion 24 into the chamber 23. In order to transmute the rotary motion of the motor into the reciprocatory motion of the slide 40, I key onto the motor shaft 51 a driving or winding drum 53, as at 54. Secured to the drum is one end of a flexible motion-transmitting member, such as a strap 56. The strap extends around a pulley 57 pivotally carried on a spindle 58 passing through the plates 41 and 44, then passes around an idler pulley 59 rotatably mounted on a stud 61 secured to the base, and finally is anchored around a column 62 extending between the plates 41 and 44.

When the motor is energized and is started from its initial or predetermined position shown, the strap 56 is wrapped around the winding drum 53 a plurality of times, thus shortening the strap 56 and drawing the slide 40 to the right as seen in Fig. 1, thereby oscillating the yoke 36. When the yoke has moved to its extreme position the motor 49 can no longer revolve and the mechanism stalls at the end of its actuated movement. As soon as the electric circuit to the motor is interrupted, the spring 13 returns the stapling machine to its original position, and the slide 40 is conjointly reciprocated toward the left, as seen in Fig. 1, thereby unwinding the strap 56 from the winding drum 53 and restoring the drum and the motor approximately to their original position.

Since such return movement is effected quickly, the momentum of the rotary mechanism tends to make the strap 56 rewind in an opposite direction after passing through the starting position. I therefore provide means for positively stopping the motor and the winding drum 53 in the initial position. Forming an extension of the drum is a threaded sleeve 66 on which is mounted a nut 67 having a friction disc 68 secured thereto. The nut 67 is resiliently prevented from rotating by a torque arm 69 encompassing the nut 67 and passing through any selected one of a plurality of notches 70 in the periphery of a band 71 concentric with the shaft 51 and fast therewith. The torque arm 69 is connected with the base through a cushioning spring 72 which is guided by a tube 73. In the initial position of this mechanism, the friction brake 68 is applied and the torque arm 69 is held by the spring 72. When the motor is operated in one direction for several revolutions to cause a stapling operation, the nut 67 is screwed along the sleeve 66 in a direction to free the friction disc 68 from the drum 53. When the motor subsequently is returned in a reverse direction toward its original position, the nut 67 is screwed back along the sleeve toward the winding drum 53. As it approaches its initial position the friction disc 68 contacts with the side of the winding drum and brakes the rotating parts, the shock of the braking engagement being taken up by the resiliency of the spring 72. The rotary parts are thus returned to and stopped in their initial positions.

In order that the motor 49 may be appropriately energized, I provide in the chamber 23 an appropriate controlling mechanism. This mechanism includes a slide block 74, preferably of insulating material, pierced by pin 75 passing through a slot 76 in the side of the base and terminating in a thumb button 77. A bow spring 78 holds the block 74 in frictional engagement with an insulating plate 79 fastened to the base 21. The block 74 can be moved fore and aft within the chamber 23 by movement of the thumb button 77 along its slot. Mounted on the block 74 are electrical contacts 81 and 82, normally spaced slightly apart. The contact 82 is connected in circuit with the motor by a brush 83 passing through the block 74 and touching a conductor strip 84 embedded in the insulating plate 79 and joined to a wire 86. Similarly, the contact 81 is connected to a brush 87 passing through the block 74 to touch a conductor strip 88 joined to a wire 89 in the circuit. In this fashion, for all adjusted or translated positions of the blocks 74 the contacts 81 and 82 are maintained in circuit.

Closure of the contacts is preferably effected by a radial arm 91 extending from a tube 92 journaled in the block 74 and normally urged toward a contact open position by a light leaf-spring 93 projecting radially from the tube 92 and bearing against the insulating plate 79. The tube 92 extends upwardly from the chamber 23 through a slot 94. Fastened to the upper end of the tube by a hinge pin 96 is a pressure finger 97 which extends over the top of the tube 92 and has a downturned terminus 98 in the path of a sheet being inserted into the slot 14 to receive a staple. The inserted sheet bears against the terminus 98 and rotates the tube 92 about its axis against the urgency of the spring 93 so that contact 81 is brought into abutment with contact 82. The electric motor 49 is thus energized to produce a stapling operation. The consequent motion of the lever 34 is preferably utilized appropriately to break the circuit.

Since the thickness of the material being stapled varies in successive operations, I preferably provide a means independent of the precise travel of the lever 34, for breaking the circuit. To this end, the lever 34 has a leaf spring 101 fastened to it by rivets 102, and the end of the spring is provided with an inertia weight 103 bearing a pad 104. When the lever 34 arrives at the end of its stroke and stops abruptly, the weight 103 continues on. The pad 104 strikes a pin 106 connected to a contact arm 107 pivotally mounted, as at 108, on an insulating block 109 fastened to the base and held by an electrically conducting leaf spring 111 in a frictionally maintained position. On the extremity of the lever 107 is a contact 112 which abuts a contact 113 carried by an apertured bracket 114 secured to the block 109 and connected to a wire 116. The spring 111 is likewise connected in series in the motor circuit by a wire 117. When the pin 106 is struck by the pad 104, the normally closed contacts 112 and 113 are separated by the resulting movement of the lever 107 and are held in open position by the frictional engagement of the leaf spring 111 with the lever 107. Upon the return movement of the lever 34 and the slide 40, the contact 112 remains apart from the contact 113 until such time as a laterally projecting arm 121 on the plate 41 abuts the lever 107 and restores it to its frictionally maintained position with contact 112 in abutment with contact 113. A tension spring 125 swings over the pivot center 108 of the lever 107 to urge the lever toward either of its extreme positions.

In addition to the foregoing circuit-breaking switch, I provide a mechanism for preventing unwarranted or undesired repetitive operation of the stapling machine for a single insertion of a sheet thereinto. Passing through the tube 92 is a pin 126, the lower end of which rests upon a hinged leaf 127 mounted by pivots 128 on hangers 129 extending from the base. On the hinged leaf 127 is an inclined projection 131 which extends into the path of movement of an extension 132 on the slide 40. This extension carries with it a yielding strip 133, including an inclined portion 134 one end of which is spaced a material distance away from the extension 132 and the other end of which is relatively close thereto. The relatively wide inclined portion is secured to the extension 132 by a narrow connecting portion 137.

During movement of the slide 40 to the right as seen in Figs. 1 and 2, and to the left as seen in Fig. 6, the projection 131 passes between the inclined portion 134 and the extension 132, but on the return movement of the slide 40 (that is, toward the right in Fig. 6 and toward the left as seen in Figs. 1 and 2) the inclined portion 134 rides above the projection 131 and depresses the projection to effect an oscillation of the hinged leaf 127. This movement of the hinged leaf lifts the rod 126 within the tube 92 and lifts the finger 97 above the plane of the sheet on the stapler. As soon as the finger 97 is lifted clear of the paper, the spring 93 is effective upon the tube 92 to rotate such tube and to propel the finger 97 to overlie the paper, so that, as the incline 134 passes the projection 131 and the restraint on the rod 126 is removed, the finger 97 drops with the projection 98 resting on top of the stapled paper. Further inserting movement of the paper is ineffective to produce a repeated operation of the machine. It is necessary to withdraw the sheet and reinsert it against the depending portion 98 for a subsequent operation.

As a safety measure, and in addition to the described switches in the electrical circuit, I provide a pair of contacts 141 and 142 which are carried on resilient contact arms 143 and 144 respectively, the latter of which is somewhat arcuate and both of which are fastened to an insulating block 146 secured to the base. Leads 147 and 148, respectively, include these contacts in series in the electrical circuit. The contacts 141 and 142 are normally closed by a roller 149 at the end of a lever 151 passing through an aperture 152 in a thumb depression 153 in the base. When the lever 151 is in the position shown in Fig. 1, the contacts 141 and 142 are closed and the machine can operate. In order for the stapling machine to be extracted or removed from the base, it is necessary to depress the handle 17 and to lift the stapling machine base. The operator must of necessity engage the forward edge of the base 6 with his thumb or forefinger. Before this can be done, the lever 151 must be depressed, forcing contacts 141 and 142 to separate, since the constraint of the roller 149 is no longer effective upon them. The circuit to the motor 49, thus being opened, cannot be closed until a stapling machine is again placed in operative position on the base.

I claim:

1. In combination, a stapling machine, a base, means for holding said stapling machine on said base, an electric motor on said base for actuating said stapling machine, and means effective at the conclusion of a stapling operation for restoring said motor to starting position.

2. A motor actuator for a stapling machine, comprising a base, means for holding a stapling machine on said base, an electrical mechanism for actuating said stapling machine, a circuit for said mechanism, a switch for said circuit, and means movable into and out of the path of an operator's hand removing said stapling machine from said base for controlling said switch.

3. A motor actuator for a stapling machine, comprising a base, uprights on said base, a yoke pivotally mounted on said uprights, a slide mounted to reciprocate on said base and engaging said yoke, an electric motor on said base, and means for transforming unidirectional rotary movement of said motor into a single direction reciprocation of said slide.

4. A motor actuator for a stapling machine, comprising a base adapted to receive a stapling machine, a slide on said base for operating said stapling machine, a rotary member for operating said slide, and means effective during an operation to reverse said rotary member back to initial predetermined position.

5. In combination, a stapling machine, a base, a slide reciprocable on said base, a rotary driving drum on said base, a strap connected to said slide and fastened to said drum to wrap therearound, means acting through said slide tending to unwrap said strap from said drum, and means for preventing unwrapping rotation of said drum beyond a predetermined position.

6. In combination, a stapling machine, a rotary driving drum, means for rotating said drum in one direction from a starting position, means for rotating said drum an approximately equivalent amount in the opposite direction, and a friction brake released and applied in accordance with the operation of said drum for holding said drum in said starting position.

7. In combination with a reciprocating mechanism having a resilient return, a rotatable motor, means coupled to said motor for translating a plurality of rotations of said motor into a unidirectional reciprocation of said mechanism, means for energizing said motor to overcome the resiliency of said return and reciprocate said mechanism in one direction, and a friction brake effective to arrest rotation of said motor accompanying reciprocation of said mechanism in the opposite direction.

SVEN SVENSON.